United States Patent
Oren et al.

(10) Patent No.: US 9,461,719 B2
(45) Date of Patent: *Oct. 4, 2016

(54) DISTRIBUTED ANTENNA SYSTEM FOR MIMO TECHNOLOGIES

(71) Applicant: Corning Optical Communications Wireless LTD, Airport (IL)

(72) Inventors: Yair Oren, Washington, DC (US); Igor Berlin, Potomac, MD (US); Rami Reuven, Rishon Letzion (IL); Ofer Saban, Vienna, VA (US); Isaac Shapira, Petach Tikva (IL)

(73) Assignee: Corning Optical Communications Wirless Ltd, Airport (IL)

( * ) Notice: Subject to any disclaimer, the term of this patent is extended or adjusted under 35 U.S.C. 154(b) by 82 days.

This patent is subject to a terminal disclaimer.

(21) Appl. No.: 14/078,949

(22) Filed: Nov. 13, 2013

(65) Prior Publication Data
US 2014/0064399 A1   Mar. 6, 2014

Related U.S. Application Data

(63) Continuation of application No. 13/598,078, filed on Aug. 29, 2012, now Pat. No. 9,130,613, which is a continuation of application No. 11/958,062, filed on Dec. 17, 2007, now Pat. No. 8,873,585.

(60) Provisional application No. 60/870,739, filed on Dec. 19, 2006.

(51) Int. Cl.
H04W 4/00     (2009.01)
H04L 5/12     (2006.01)

(Continued)

(52) U.S. Cl.
CPC ............ *H04B 7/0413* (2013.01); *H04B 7/022* (2013.01); *H04B 7/0602* (2013.01); *H04B 10/271* (2013.01)

(58) Field of Classification Search
CPC ... H04B 7/022; H04B 7/0413; H04B 7/0602
USPC .......................................................... 370/328
See application file for complete search history.

(56) References Cited

U.S. PATENT DOCUMENTS 5,159,478 A   10/1992   Talagi
5,159,479 A   10/1992   Takagi (Continued)

FOREIGN PATENT DOCUMENTS

EP   0355328 A2   2/1990   ............... H04B 7/08
EP   0709974 A1   5/1996   ............... H04B 7/08

(Continued)

OTHER PUBLICATIONS

Bahl, et al., "Enhancements to the Radar User Location and Tracking System," Microsoft Research Technical Report, Feb. 2000, pp. 1-13.

(Continued)

*Primary Examiner* — Gerald Smarth
(74) *Attorney, Agent, or Firm* — C. Keith Montgomery

(57) ABSTRACT

A method and system for supporting M1MO technologies which can require the transport of multiple spatial streams on a traditional Distributed Antenna System (DAS). According to the invention, at one end of the DAS, each spatial stream is shifted in frequency to a pre-assigned band (such as a band at a frequency lower than the native frequency) that does not overlap the band assigned to other spatial streams (or the band of any other services being carried by the DAS). Each of the spatial streams can be combined and transmitted as a combined signal over a common coaxial cable. At the other "end" of the DAS, the different streams are shifted back to their original (overlapping) frequencies but retain their individual "identities" by being radiated through physically separate antenna elements.

5 Claims, 3 Drawing Sheets

(51) Int. Cl.
*H04B 7/04* (2006.01)
*H04B 7/02* (2006.01)
*H04B 7/06* (2006.01)
*H04B 10/27* (2013.01)

(56) References Cited

U.S. PATENT DOCUMENTS

| | | | |
|---|---|---|---|
| 5,278,690 A | 1/1994 | Vella-Coleiro | |
| 5,339,184 A | 8/1994 | Tang | 359/124 |
| 5,502,446 A | 3/1996 | Denninger | 342/357 |
| 5,583,517 A | 12/1996 | Yokev et al. | 342/457 |
| 5,661,582 A | 8/1997 | Kintis et al. | |
| 5,805,975 A | 9/1998 | Green, Sr. et al. | |
| 5,809,395 A | 9/1998 | Hamilton-Piercy et al. | 455/4.1 |
| 5,828,658 A | 10/1998 | Ottersten et al. | 370/310 |
| 5,832,379 A | 11/1998 | Mallinckrodt | 455/427 |
| 5,835,857 A | 11/1998 | Otten | 455/410 |
| 5,995,832 A | 11/1999 | Mallinckrodt | 455/427 |
| 6,049,705 A | 4/2000 | Xue | 455/277.1 |
| 6,198,432 B1 | 3/2001 | Janky | 342/357.14 |
| 6,268,946 B1 | 7/2001 | Larkin et al. | |
| 6,301,240 B1 | 10/2001 | Slabinski et al. | |
| 6,308,085 B1 | 10/2001 | Shoki | |
| 6,374,124 B1 | 4/2002 | Slabinski | |
| 6,504,636 B1 | 1/2003 | Seto et al. | |
| 6,504,831 B1 | 1/2003 | Greenwood et al. | |
| 6,580,393 B2 | 6/2003 | Holt | 342/453 |
| 6,696,917 B1 | 2/2004 | Heitner et al. | |
| 6,801,767 B1 | 10/2004 | Schwartz et al. | |
| 6,895,249 B2 | 5/2005 | Gaal | 455/456.1 |
| 6,914,539 B2 | 7/2005 | Hoctor et al. | 340/870.12 |
| 7,006,039 B2 | 2/2006 | Miyamoto et al. | 342/370 |
| 7,023,382 B1 | 4/2006 | Akano | 342/386 |
| 7,092,726 B2 | 8/2006 | Shi et al. | 455/456.6 |
| 7,123,939 B1 | 10/2006 | Bird et al. | 455/561 |
| 7,250,907 B2 | 7/2007 | Krumm et al. | 342/451 |
| 7,429,951 B2 | 9/2008 | Kennedy, Jr. et al. | 342/465 |
| 7,483,504 B2 | 1/2009 | Shapira et al. | 375/347 |
| 7,627,250 B2 | 12/2009 | George et al. | |
| 7,715,722 B1 | 5/2010 | Hoke et al. | |
| 8,275,265 B2 | 9/2012 | Kobyakov et al. | |
| 8,310,963 B2 | 11/2012 | Singh | |
| 8,548,330 B2 | 10/2013 | Berlin et al. | |
| 8,599,794 B2 | 12/2013 | Ahmadi | |
| 8,676,214 B2 | 3/2014 | Fischer et al. | |
| 8,873,585 B2 | 10/2014 | Oren et al. | |
| 8,913,892 B2 | 12/2014 | Berlin et al. | |
| 9,130,613 B2 | 9/2015 | Oren et al. | |
| 2002/0085643 A1 | 7/2002 | Kitchener et al. | 375/267 |
| 2003/0002604 A1 | 1/2003 | Fifield et al. | |
| 2004/0017785 A1 | 1/2004 | Zelst | |
| 2004/0037565 A1* | 2/2004 | Young | H04B 10/25753 398/115 |
| 2004/0068751 A1 | 4/2004 | Basawapatna et al. | |
| 2004/0100930 A1 | 5/2004 | Shapira et al. | 370/338 |
| 2004/0102196 A1 | 5/2004 | Weckstrom et al. | 455/456.1 |
| 2004/0164902 A1 | 8/2004 | Karlsson et al. | 342/449 |
| 2004/0165568 A1 | 8/2004 | Weinstein | 370/344 |
| 2005/0041693 A1 | 2/2005 | Priotti | |
| 2005/0176458 A1 | 8/2005 | Shklarsky et al. | |
| 2006/0025101 A1 | 2/2006 | Li | |
| 2006/0046662 A1 | 3/2006 | Moulsley et al. | 455/69 |
| 2006/0056283 A1 | 3/2006 | Anikhindi et al. | 370/208 |
| 2006/0063494 A1 | 3/2006 | Zhang et al. | 455/78 |
| 2006/0120395 A1 | 6/2006 | Xing et al. | |
| 2006/0128425 A1 | 6/2006 | Rooyen | 455/552.1 |
| 2006/0189280 A1 | 8/2006 | Goldberg | |
| 2006/0203836 A1 | 9/2006 | Kim | |
| 2006/0217132 A1 | 9/2006 | Drummond-Murray et al. | 455/456.2 |
| 2006/0223439 A1 | 10/2006 | Pinel et al. | |
| 2006/0262014 A1 | 11/2006 | Shemesh et al. | 342/386 |
| 2006/0276227 A1 | 12/2006 | Dravida | 455/562.1 |
| 2007/0072646 A1 | 3/2007 | Kuwahara et al. | |
| 2007/0099578 A1 | 5/2007 | Adeney et al. | |
| 2007/0104165 A1 | 5/2007 | Hanaoka et al. | 370/338 |
| 2007/0135169 A1 | 6/2007 | Sychaleun et al. | 455/562.1 |
| 2007/0155314 A1 | 7/2007 | Mohebbi | |
| 2007/0173288 A1 | 7/2007 | Skarby et al. | 455/561 |
| 2007/0182626 A1 | 8/2007 | Samavati et al. | 342/357.06 |
| 2007/0184841 A1 | 8/2007 | Choi et al. | |
| 2007/0264009 A1 | 11/2007 | Sabat, Jr. et al. | 398/5 |
| 2007/0280370 A1 | 12/2007 | Liu | |
| 2008/0005219 A1 | 1/2008 | Nabar et al. | 709/201 |
| 2008/0008134 A1 | 1/2008 | Satou et al. | |
| 2008/0013473 A1 | 1/2008 | Proctor, Jr. et al. | 370/315 |
| 2008/0107202 A1 | 5/2008 | Lee et al. | |
| 2008/0129594 A1 | 6/2008 | Pera et al. | |
| 2008/0233967 A1 | 9/2008 | Montojo et al. | |
| 2008/0291818 A1 | 11/2008 | Leisten | |
| 2009/0092073 A1* | 4/2009 | Doppler | H04B 7/022 370/315 |
| 2009/0239521 A1 | 9/2009 | Mohebbi | |
| 2010/0246541 A9 | 9/2010 | Kim | |
| 2010/0265874 A1 | 10/2010 | Palanki et al. | |
| 2011/0008042 A1 | 1/2011 | Stewart | |
| 2011/0135308 A1 | 6/2011 | Tarlazzi et al. | |
| 2011/0200325 A1 | 8/2011 | Kobyakov et al. | |
| 2011/0222616 A1 | 9/2011 | Jiang et al. | |
| 2011/0243201 A1 | 10/2011 | Phillips et al. | |
| 2011/0305284 A1 | 12/2011 | Mueck et al. | |
| 2012/0002750 A1 | 1/2012 | Hooli et al. | |
| 2012/0046039 A1 | 2/2012 | Hagerman et al. | |
| 2012/0087670 A1 | 4/2012 | Han et al. | |
| 2012/0140660 A1 | 6/2012 | Kang et al. | |
| 2012/0170542 A1 | 7/2012 | Zangi | |
| 2012/0177026 A1* | 7/2012 | Uyehara | H04B 1/18 370/345 |
| 2012/0208581 A1 | 8/2012 | Ishida et al. | |
| 2012/0213111 A1 | 8/2012 | Shimezawa et al. | |
| 2012/0243513 A1 | 9/2012 | Fujishima et al. | |
| 2012/0327800 A1 | 12/2012 | Kim et al. | |
| 2013/0095875 A1 | 4/2013 | Reuven | |
| 2013/0101005 A1 | 4/2013 | Aryanfar | |
| 2013/0150063 A1 | 6/2013 | Berlin et al. | |
| 2013/0195000 A1 | 8/2013 | Shen et al. | |
| 2013/0235962 A1 | 9/2013 | O'Keefe et al. | |
| 2014/0078920 A1 | 3/2014 | Tandra et al. | |
| 2014/0126914 A1 | 5/2014 | Berlin et al. | |
| 2014/0226698 A1 | 8/2014 | Negus et al. | |
| 2015/0023283 A1 | 1/2015 | Liu et al. | |

FOREIGN PATENT DOCUMENTS

| | | | |
|---|---|---|---|
| EP | 0938204 A1 | 8/1999 | H04J 13/00 |
| EP | 1085684 A2 | 3/2001 | H04B 17/00 |
| EP | 2219310 A1 | 8/2010 | |
| GB | 2313020 A | 11/1997 | H04B 7/06 |
| JP | H4189036 A | 7/1992 | |
| JP | 5-252559 | 9/1993 | H04Q 7/04 |
| JP | 5-327569 | 12/1993 | H04B 7/04 |
| JP | 5-327576 | 12/1993 | H04B 7/26 |
| JP | 1993327569 A | 12/1993 | |
| KR | 20010055088 A | 7/2001 | |
| WO | WO 96/13102 | 5/1996 | H04B 7/02 |
| WO | WO 98/04054 | 1/1998 | H04B 7/04 |
| WO | WO01/86755 A2 | 11/2001 | H01Q 3/26 |
| WO | WO 02/091618 A1 | 11/2002 | H04B 7/00 |
| WO | WO 2004/107783 A1 | 12/2004 | H04Q 7/30 |
| WO | WO 2006/105185 A2 | 10/2006 | H04B 1/38 |
| WO | WO 2006/136811 A1 | 12/2006 | H04B 10/12 |
| WO | WO 2007/133630 A2 | 11/2007 | C01F 7/02 |
| WO | 2011005162 A1 | 11/2011 | |
| WO | 2011158302 A1 | 12/2011 | |
| WO | 2012148256 A1 | 11/2012 | |

OTHER PUBLICATIONS

Frikel, et al., "A Robust Mobile Positioning Algorithm," EURASIP Proceedings, ISCCSP 2006, pp. 1-4.
Pahlavan, et al., "An Overview of Wireless Indoor Geolocation Techniques and Systems," LNCS 1818, pp. 1-13.

(56) References Cited

OTHER PUBLICATIONS

Wann, et al., "Hybrid TDOA/AOA Indoor Positioning and Tracking Using Extended Kalman Filters," $63^{rd}$ IEEE VTC 2006, pp. 1058-1062.
Examination Report for European Patent Application No. 11733965.5 mailed Oct. 10, 2014, 6 pages.
Non-final Office Action for U.S. Appl. No. 13/598,078 mailed Dec. 22, 2014, 7 pages.
Notice of Allowance for U.S. Appl. No. 14/242,139 mailed Oct. 22, 2014, 12 pages.
Defendants' Invalidity Contentions in *Corning Optical Communications Wireless LTD.* v. *Solid, Inc. and Reach Holdings, LLC* in Case No. 5:14-cv-03750-PSG in United States District Court, Northern District of California, San Jose Division, Dated Dec. 5, 2014, 27 pages. (Redacted).
Biton et al., "Challenge: CeTV and Ca-Fi—Cellular and Wi-Fi over CATV," Proceedings of the Eleventh Annual International Conference on Mobile Computing and Networking, Aug. 28-Sep. 2, 2005, Cologne, Germany, Association for Computing Machinery, 8 pages.
Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.
Ibernon-Fernandez, R., et al., "Comparison Between Measurements and Simulations of Conventional and Distributed MIMO System," IEEE Antennas and Wireless Propagation Letters, vol. 7, Aug. 2008, pp. 546-549.
Tarlazzi L., et al., "Characterization of an Interleaved F-DAS MIMO Indoor Propagation Channel," Loughborough Antennas & Propagation Conference, Nov. 2010, Loughborough, United Kingdom, IEEE, pp. 505-508.
Tolli, Antti, "Resources Managment in Cooperative MIMO-OFDM Cellular Systems," Academic Dissertation—ACTA Universities Ouluensis, No. C Technica 296, Apr. 11, 2008, pp. 1-198.
Vitucci, E.M., et al., "Analysis of the Performance of LTE Systems in an Interleaved F-DAS MIMO Indoor Environment," Proceedings of the 5th European Conference on Antennas and Propgation (EUCAP), Apr. 11-15, 2011, Rome, Italy, IEEE, pp. 2184-2186.
Wei, Xinning, et al., "Cooperative communcation with parital channel-state information in multiuser MIMO systems," International Journal of Electronics and Communications, vol. 65, No. 4, Apr. 2011 (available online May 15, 2010), Elsevier GmbH, pp. 349-360.
International Search Report for PCT/US2013/070489 mailed Feb. 24, 2014, 4 pages.
Written Opinion for European Patent Application No. 13798863.0 mailed Aug. 6, 2015, 10 pages.
Notice of Allowance for U.S. Appl. No. 14/227,108 mailed Nov. 18, 2015, 8 pages.
Final Office Action for U.S. Appl. No. 14/487,232 mailed Oct. 15, 2015, 7 pages.
Diehm, et al., "The Futon Prototype: Broadband Communication through Coordinated Multi-Point using a Novel integrated Optical/Wireless Architecture," Presented at Globecom Workshops, Dec. 6-10, 2010, Miami, Florida, IEEE, pp. 757-762.
Fan, Shu-Hao et al., "Spectrally Efficient 60-GHz xy-MIMO Data Transport over a Radio-Over-Fiber System for Gigabit Wireless Local Area Networks," Presented at IEEE Global Telecommunications Conference, Dec. 6-10, 2010, Miami, Florida, IEEE, 4 pages.
Hansryd, Jonas et al., "Microwave capacity evolution," Ericsson Review, Jun. 21, 2011, 6 pages.
Lee et al., "Evaluation of 60 GHz MIMO Channel Capacity in the Conference Room STA-STA Scenario," Vehicular Technology Conference (VTC Sping), 2011 IEEE 73rd, pp. 1-5, May 15-18, 2011.
Sheldon, C. et al., "A 60GHz Line-of-Sight 2x2 MIMO Link Operating at 1.2 Gbps," Presented at Antennas and Propogation Society International Symposium, Jul. 5-11, 2008, San Diego, California, IEEE, 4 pages.
International Search Report for PCT/US2013/034328 mailed Jul. 3, 2013, 5 pages.
International Preliminary Report on Patentability for PCT/US2013/034328 mailed Oct. 1, 2014, 8 pages.
Notice of Allowance for U.S. Appl. No. 13/598,078 mailed May 12, 2015, 8 pages.
Non-final Office Action for U.S. Appl. No. 14/148,908 mailed May 22, 2015, 20 pages.
Non-final Office Action for U.S. Appl. No. 14/487,232 mailed Jun. 23, 2015, 15 pages.
Patent Cooperation Treaty, Written Opinion of the International Searching Authority for PCT/US2007/025855, dated Jun. 19, 2009, 6 pages.
Non-final office action for U.S. Appl. 14/078,949 mailed Sep. 10, 2015, 29 pages.
Non-final Office Action for U.S. Appl. No. 14/447,014 mailed Jan. 20, 2016, 6 pages.
Non-final Office Action for U.S. Appl. No. 14/721,357, mailed Jan. 4, 2016, 10 pages.
Notice of Allowance for U.S. Appl. No. 14/078,949 mailed Feb. 3, 2016, 9 pages.
Defendants' Invalidity Contentions in *Corning Optical Communications Wireless Ltd.* V. *Solid, Inc.* and 1 Reach Holdings, LLC in Case No. 5:14-cv-03750-PSG in United States District Court, Northern D District of California, San Jose Division, Dated Dec. 5, 2014, 27 pages (Redacted).
Heath, Robert, et al., "Multiuser MIMO in Distributed Antenna Systems with Out-of-Cell Interference;" IEEE Transactions on Signal Processing, vol. 59, Issue 10, Oct. 2011, IEEE, 4885-4899.
Non-final Office Action for U.S. Appl. No. 14/079,977 mailed Mar. 4, 2016, 21 pages.
Notice of Allowance for U.S. Appl. No. 14/079,977 mailed Apr. 29, 2016, 8 pages.
Final Office Action for U.S. Appl. No. 14/721,357 mailed Mar. 1, 2016, 12 pages.

* cited by examiner

DISTRIBUTED ANTENNA SYSTEM FOR MIMO TECHNOLOGIES

CROSS-REFERENCE TO RELATED APPLICATIONS

The present application is a continuation application of U.S. patent application Ser. No. 13/598,078 filed on Aug. 29, 2012 and entitled "Distributed Antenna System for MIMO Technologies," which is a continuation of U.S. patent application Ser. No. 11/958,062 filed Dec. 17, 2007, which claims the benefit of Provisional Application No. 60/870,739 filed on Dec. 19, 2006, all of which are hereby incorporated by reference in their entireties.

RELATED APPLICATION

The present application is related to U.S. patent application Ser. No. 12/026,557 filed on Feb. 6, 2008 and entitled "MIMO-Adapted Distributed Antenna System."

STATEMENT REGARDING FEDERALLY SPONSORED RESEARCH

Not Applicable.

REFERENCE TO MICROFICHE APPENDIX

Not Applicable.

BACKGROUND

Technical Field of the Invention

The present invention is directed to Distributed Antenna Systems and more particularly, to methods and systems for transmitting multiple signals or spatial streams over the same RF frequencies using a Distributed Antenna System ("DAS").

The present invention is directed to a DAS intended to support wireless services employing MIMO technologies, such as a WiMax network. Traditionally, a base station connected to a DAS transmits a single signal (one or more RF carriers) within a frequency band. In the case of a MIMO-enabled base station, multiple signals, often referred to as spatial streams, are transmitted on the same RF frequencies. In order for a DAS to adequately support the distribution of this service, it needs to carry the multiple spatial streams to each radiating point, and at each radiating point radiate (and receive) the different streams on separate antenna elements.

One challenge for a traditional DAS architecture in addressing these requirements is that a traditional DAS carries signals at their native RF frequency. Therefore carrying multiple signals at the same frequency (namely the multiple spatial streams) may require the deployment of parallel systems.

SUMMARY OF THE INVENTION

In referring to the signal flows in DAS systems, the term Downlink signal refers to the signal being transmitted by the source transmitter (e.g. cellular base station) through an antenna to the terminals and the term Uplink signal refers to the signals being transmitted by the terminals which are received by an antenna and flow to the source receiver. Many wireless services have both an uplink and a downlink, but some have only a downlink (e.g. a mobile video broadcast service) or only an uplink (e.g. certain types of medical telemetry).

In accordance with the invention, multiple spatial streams are transported on a traditional DAS architecture whereby, at the input end, each spatial stream is shifted in frequency to a pre-assigned band (such as a band at a frequency lower than the native frequency) that does not overlap the band assigned to other spatial stream (or the band of any other services being carried by the DAS). At the other "end" of the DAS, the different streams are shifted back to their original (overlapping) frequencies but retain their individual "identities" by being radiated through physically separate antenna elements. In one embodiment, frequency shifting can be implemented using frequency mixers.

Most wireless services of interest in this context are bi-directional, meaning they have both a Downlink (signals transmitted from Base station to terminals) and an Uplink (signal transmitted from terminal to Base station). Some wireless technologies operate in FDD (Frequency division duplexing) mode, meaning Downlink (DL) and Uplink (UL) operate simultaneously on different frequencies, while others operate in TDD (Time division duplexing) mode, meaning DL and UL alternate in time using the same frequency bands.

The cabling technologies used in a DAS can differ in the way they transfer DL and UL on the same medium (e.g., cable or fiber). Fiber links can use a separate fiber strand (or wavelength in WDM systems) for UL and DL. Therefore, Fiber links can easily support both FDD and TDD modes.

Coax links usually use a single cable for both DL and UL. For FDD services, this does not present a problem since the DL and UL signals can use different frequencies. For TDD services, two different embodiments can be used. In one embodiment, a separate frequency for DL and UL can be used (meaning one or both of the DL and UL need to be shifted from their native, overlapping frequencies to non-overlapping frequencies). In an alternative embodiment, a switching mechanism can be used to alternate the DL and the UL transmission on the same frequency. This embodiment has the advantage of using less spectrum resources, allowing other services (at other frequencies) to run on the same cable.

These and other capabilities of the invention, along with the invention itself, will be more fully understood after a review of the following figures, detailed description, and claims.

DESCRIPTION OF THE INVENTION

In accordance with the invention, a method and system can be implemented in a DAS architecture which uses both fiber links and coax links, for a MIMO service using 2 or more spatial streams and operating in TDD mode. Other configurations, such as those supporting 3 or more special streams, would require simple variations on the scheme presented below.

Figure 1:
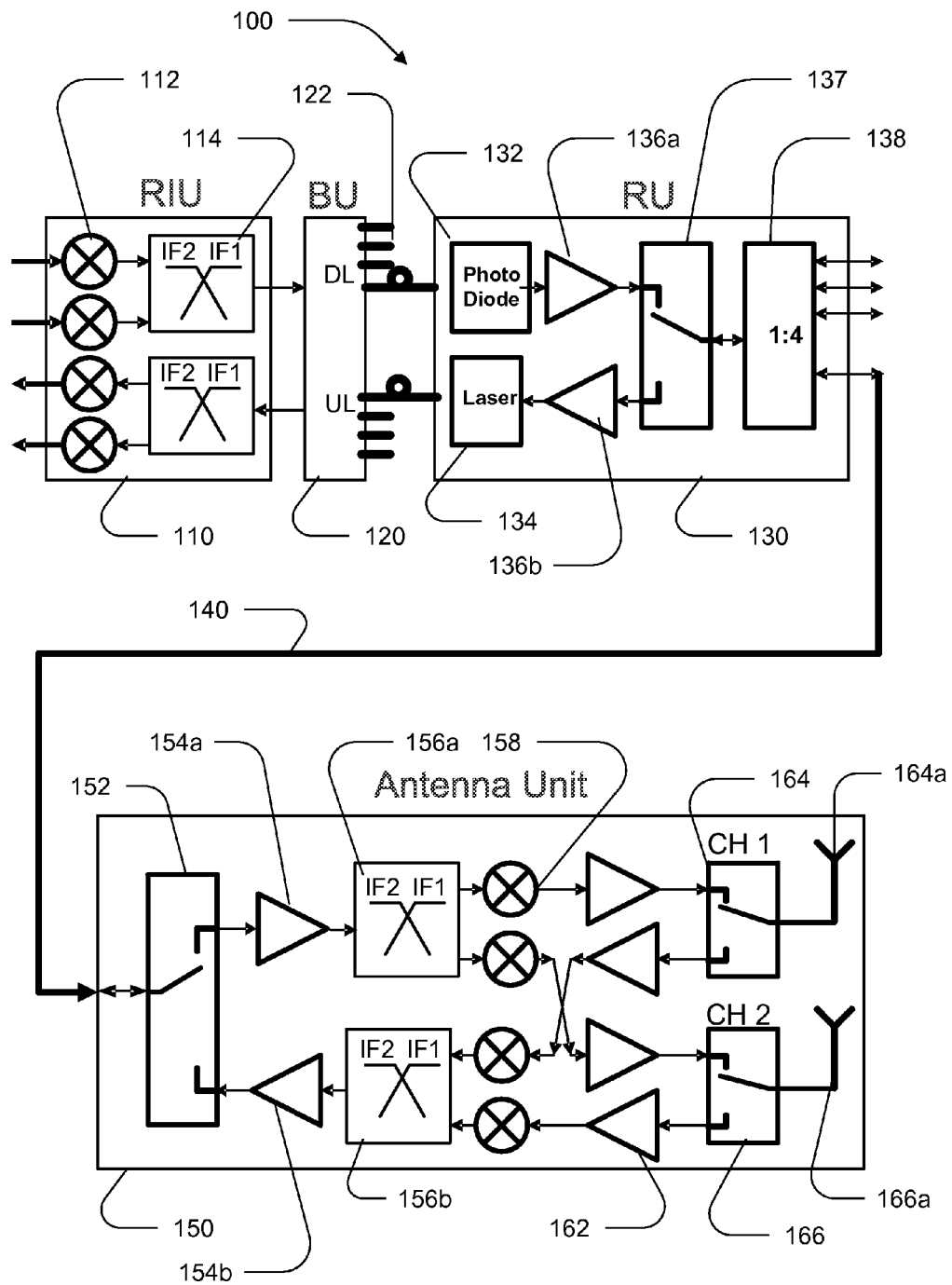
FIG. 1 is a block diagram of an embodiment of a distributed antenna system according to the invention.

FIG. 1 shows an example of a DAS 100 in accordance with the invention. The DAS can include a Radio Interface Unit (RIU) 110, a Base Unit (BU) 120, a Remote Unit (RU) 130 and an Antenna Unit (AU) 150.

The RIU 110 provides the interface to the Base station (BTS, not shown). In this embodiment, the RIU has two DL connections from the BTS and two UL connections to the BTS, however a single DL/UL connection or more than two DL and UL connections can be carried by the system. The RIU 110 can include a mixer 112 on each DL connection and a mixer 112 on each UL connection. The RIU 110 can implement the frequency shifting ("down-converting") for the multiple DL spatial stream signals, mapping each to a different non-overlapping frequency band. For example the DL signals can be down-converted from the WiMAX 2.5 GHz-2.7 GHz frequency bands to the 100 MHz-300 MHz frequency band or the 320 MHz-520 MHz frequency band. It implements the opposite for the UL signals. The mixers 112 can change the signal frequency on each DL connection to a different non-overlapping frequency band so that all the signals can be carried on the same cable without interference. The duplexer 114a combines the DL connections (which use different frequency bands) onto a common cable and can output the signals to the BU 120.

Similarly, the UL signals received from the BU 120 can be input into a de-duplexer 114b, which separates the UL into separate connections. Each of UL connections can be input to a mixer 112 and converted back to their original or native frequency bands for transmission back to the BTS. For example, the UL signals can be up-converted from the 100 MHz-300 MHz frequency band or the 320 MHz-520 MHz frequency band to the WiMAX 2.5 GHz-2.7 GHz frequency. In an alternative embodiment the same frequencies can be shared for DL and UL and the same circuits and mixers can be used for both DL & UL, alternating in time. In accordance with the invention, where the same frequencies are shared by the DL and UL, the same circuits and mixers can be used for both the DL and UL signal paths, alternating in time using, for example, time division multiplexing.

The BU 120 can convert the DL RF signal to an optical signal and split that signal into multiple optical links 122 which can be connected to multiple Remote Units RUs 150. The BU 120 implements the opposite for UL signals. The BU 120 allows the signals to be distributed, for example, to multiple buildings of campus wide network or multiple floors of a building. The BU 120 can be a dual point to multi-point device that converts an input RF DL signal in to multiple optical output signals, for example to transmit the signals over a fiber-optic link 122 and receives multiple optical input signals and combines them onto a single RF UL signal. One example of a BU 120, is a Mobile Access Base Unit above from MobileAccess Networks, Inc., of Vienna, Va.

The RIU 110 and BU 120 can be co-located and, optionally, can be combined into a single physical element or component. Where the RIU 110 and the Bu 120 are co-located, coaxial cable or twisted pair copper wire can be used to interconnect the units.

The RUs 130 can be located in wiring closets in different areas (e.g. floors) of a building. The RU 130 can include a media converting component 132, 134 for converting optical signals to electronic signals (DL connection) and electronic signals to optical signals (UL connection), amplifiers 136a, 136b for amplifying the signals as necessary, a time division duplexing (TDD) switching mechanism 137 for combining the DL and UL signals on a common transmission medium, and a multiplexer 138 for splitting the signal for transmission to multiple antennae and receiving signals from multiple antennae. For the DL connection, the RU 130 can transform the signals from optical to RF, be processed by the TDD switching mechanism 137, and using the multiplexer 138, split the signals onto multiple coaxial cables 140 going to multiple Antenna Units 150. The RU 130 implements the opposite for UL signals. In addition the RU can provide powering over the coax cables to the antenna units.

On the DL connection, the RU 130 can include a photo diode based system 132 for converting the optical signal to an RF signal. An amplifier 136a can be provided to adjust the amplitude of the signal before it is input into a time division duplexing (TDD) switch 137. The TDD switch 137 can be connected to a multiplexer 138 which can connect the DL connection to multiple Antenna Units AU 150 over a cable 140, such as a coaxial cable.

On the UL connection, the RU 130 receives RF signals from one or more Ails 150 and inputs each signal into multiplexer 138 which multiplexes the UL signals onto a single connection. The single UL connection can be fed into the TDD switch 137. The TDD switch 137 separates the UL connection from the DL connection and converts the UL signal to an optical signal. An amplifier 136b can be provided to adjust the amplitude of the signal before transmission to the BU 120. The RU 130 can include a laser based optical system 134 for converting the electrical signals to optical signals.

The Antenna Units (AU) 150 can be located in the ceilings of the building. For the DL, the AU 150 implements the TDD mechanism 152 separating the DL and UL signals (opposite the RU 130), up-converts the two or more spatial channels to their native frequencies and transmits each on a dedicated antenna element, with appropriate amplification. For the UL connection, the AU 150 implements the opposite for UL signals. The UL signals received from the antenna elements 164A, 166A are amplified 162 as necessary and then down-converted by mixers 158 from their native frequencies to a non-overlapping intermediate frequency and combined onto a single line by duplexer 156b for transmission back to the RU 130.

The AU 150 can include a TDD switch mechanism 152 for duplexing and deduplexing (combining and separating) the UL connections and the DL connections, an amplifier for the DL connections 154a and the UL connections 154b, a deduplexer 156a for recovering the two DL connections, a duplexer 156b for combining the two UL connections, a mixer 158 for each DL connection for restoring the RF frequency of the signal for transmission to the antenna 164A, a mixer 158 for each UL connection for converting the RF frequency of each UL connection to different, non-overlapping frequency bands, amplifiers 162 for each of the DL and UL connection, a TDD switching mechanism 164 for channel 1 which connects the RF signal to antenna 164A and a TDD switching mechanism for channel 2 which connects the RF signal to antenna 166A.

For the DL, the AU 150 implements the opposite of the RU 130 in that it de-duplexes the signal into two or more spatial stream and up-converts the two or more spatial streams to the native frequency for transmission on a dedicated antenna element, with the appropriate amplification. For the UL, the AU 150 down-converts the two or more spatial streams to a lower frequency band and duplexes them onto a single cable for transmission to the RU 130.

When the frequencies used for transport through the DAS (the "down-converted" signals) are relatively low, it is possible to use low cost cabling such as Multi-mode fiber and CATV-grade coax (e.g. RG-11 or RG-6). For example, the down-converted signals can be in the 100 MHz-300 MHz and 320 MHz-520 MHz frequency bands.

Figure 2:
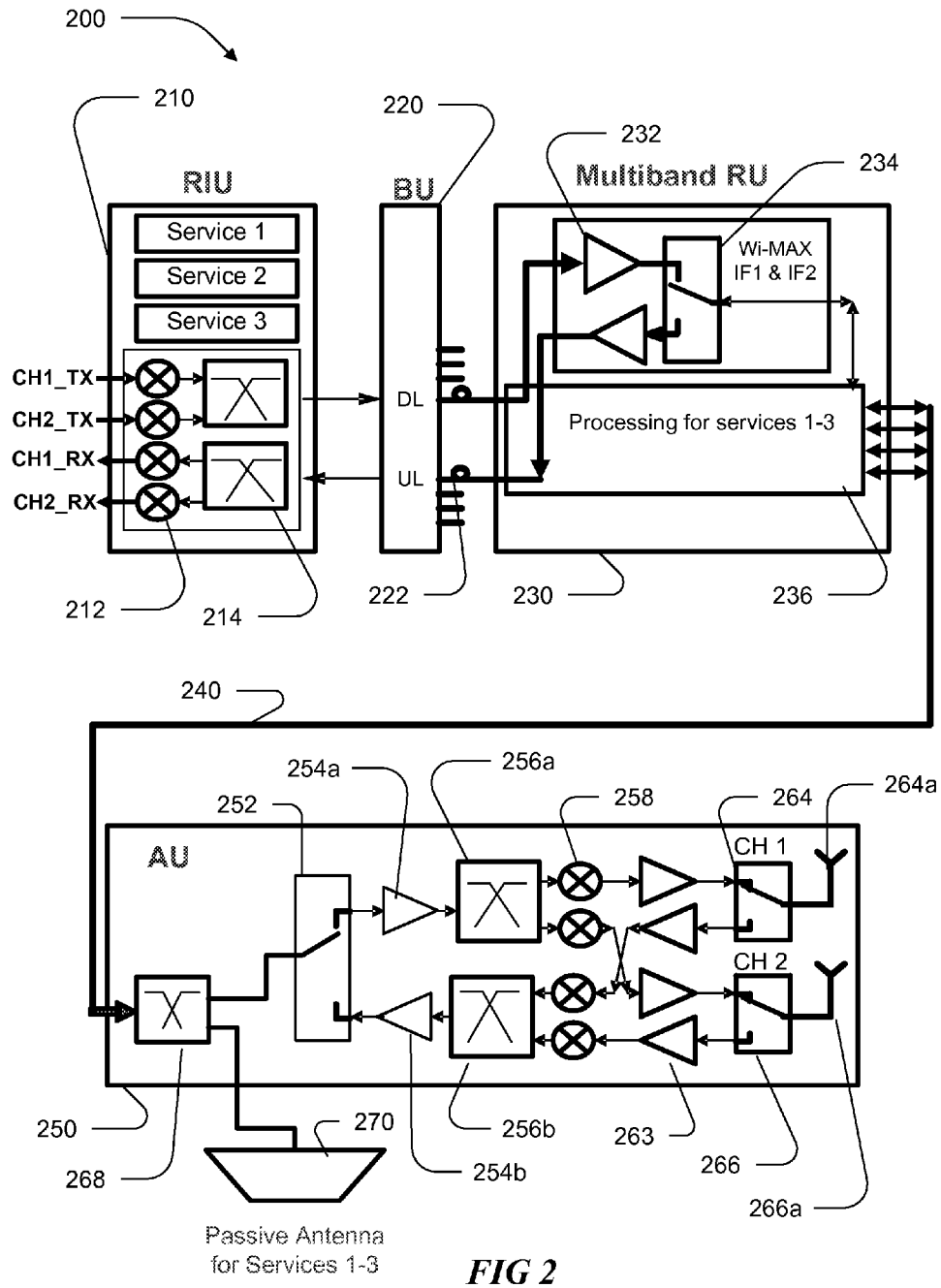
FIG. 2 is a block diagram of an alternate embodiment of a distributed antenna system according to the invention.

As shown in FIG. 2, the present invention can also be used to combine other services, such as non-MIMO services, on the same system, with the same cabling infrastructure. Additional MIMO bands can be handled in the same way, and they would be transported using additional non-overlapping frequency bands with respect to the frequency bands used for the first MIMO service. Non-MIMO bands can be transported at their native frequency and amplified at the RU, using passive antenna elements to radiate them at the AU.

In an embodiment similar to FIG. 1, FIG. 2 shows an embodiment of the present invention combined with other services. The DAS 200 includes a Radio Interface Unit (RIU) 210, a Base Unit (BU) 220, a Multiband Remote Unit (RU) 230 and an Antenna Unit (AU) 250.

The RIU 210 can include two or more spatial stream inputs from BTS (not shown) and any number of other services, for example, Service 1, Service 2, and Service 3. As described above with regard to FIG. 1, mixers 212 can be used to down-convert the DL connection and up-convert the UL connection, and a duplexer/de-duplexer 214 can be use can be used to combine the DL streams and separate the UL streams. The RIU 210 sends the DL signals to the BU 220 and receives the UL signals from the BU 220.

The other services can include any other service that uses frequency bands that do not interfere with the frequency bands already used by the system. In one embodiment of the invention, the spatial streams on Channel 1 and Channel 2 provide WiMAX network services in the 2.5-2.7 GHz frequency band and the other services can include, for example, CDMA based services (e.g. in the 1.9 GHz PCS band) and iDEN based services (e.g. in the 800 MHz and 900 MHz bands).

The BU 220 can be same as described above and shown in FIG. 1. The BU 220 can be any device that converts the DL RF signal to an optical signal and splits the signal to feed multiple optical links and combines the UL optical signals received over multiple optical links and converts the UL optical signals into RF signals.

In accordance with the embodiment shown in FIG. 2, the Multiband RU 230 receives the DL optical signals from the BU 220 and sends UL optical signals to the BU 220. The processing block 236 can include the components of FIG. 1, including the photo diode based system for converting the DL optical signals back to RF signals and the laser based system for converting the UL RF signals to optical signals and amplifiers for adjusting the signal amplitude as necessary. The processing block 236 can also include duplexer/de-duplexer system for combining the DL RF signals with the signals for the other services and separating the UL RF signals from the signals for other services. The processing block 236 can also include a multiplexer for splitting the combined DL signal to be transmitted to multiple antenna units 250 and for combining the individual UL signals received from the multiple antenna units 250.

The AU 250 of FIG. 2 is similar to the AU 150 of FIG. 1, in that it includes a TDD switching system 252, amplifiers 254a and 254b, de-duplexer 256a, duplexer 256b, mixers 258, amplifiers 262, TDD switching system 264, TDD switching system 266, antenna 264a and antenna 266a. In addition, AU 250 includes duplexer/de-duplexer 268 which separates the signals for the other services from DL RF signal and feeds the signals for the other services to passive antenna 270 and the spatial streams to TDD switching system 252. For the UL signals, the duplexer/de-duplexer 268 combines the signals for the other services with the spatial streams in order to send them to the Multiband RU 230.

In cases where significant capacity is required in a facility covered by a DAS, multiple base-stations (or multiple sectors on a single base station) can be used to "feed" the DAS, where each segment of the DAS can be associated with one of the base stations/sectors. In order to provide additional flexibility in assigning capacity to areas in the facility, it is desirable to be able to independently associate each AU with any one of the base stations/sectors.

In accordance with one embodiment of the invention, the RIU can have multiple, separate interfaces for each base station/sector (2 spatial streams from each in the 2-way MIMO example discussed above). The RIU can map each pair of signals from each base station/sector to a different pair of bands, non-overlapping with the bands assigned to other base stations/sectors. The BU and RU can retain the same functionality as above. The AU can have the ability using software to select the specific sector to use, based on tuning to the respective frequency bands.

However, one of the disadvantages of the approach described in the previous paragraph is that multiple blocks of spectrum are required on the link between the RU 130,230 and the AU 150,250 in order to support multiple sectors. This reduces the amount of spectrum available to support other services.

Figure 3:
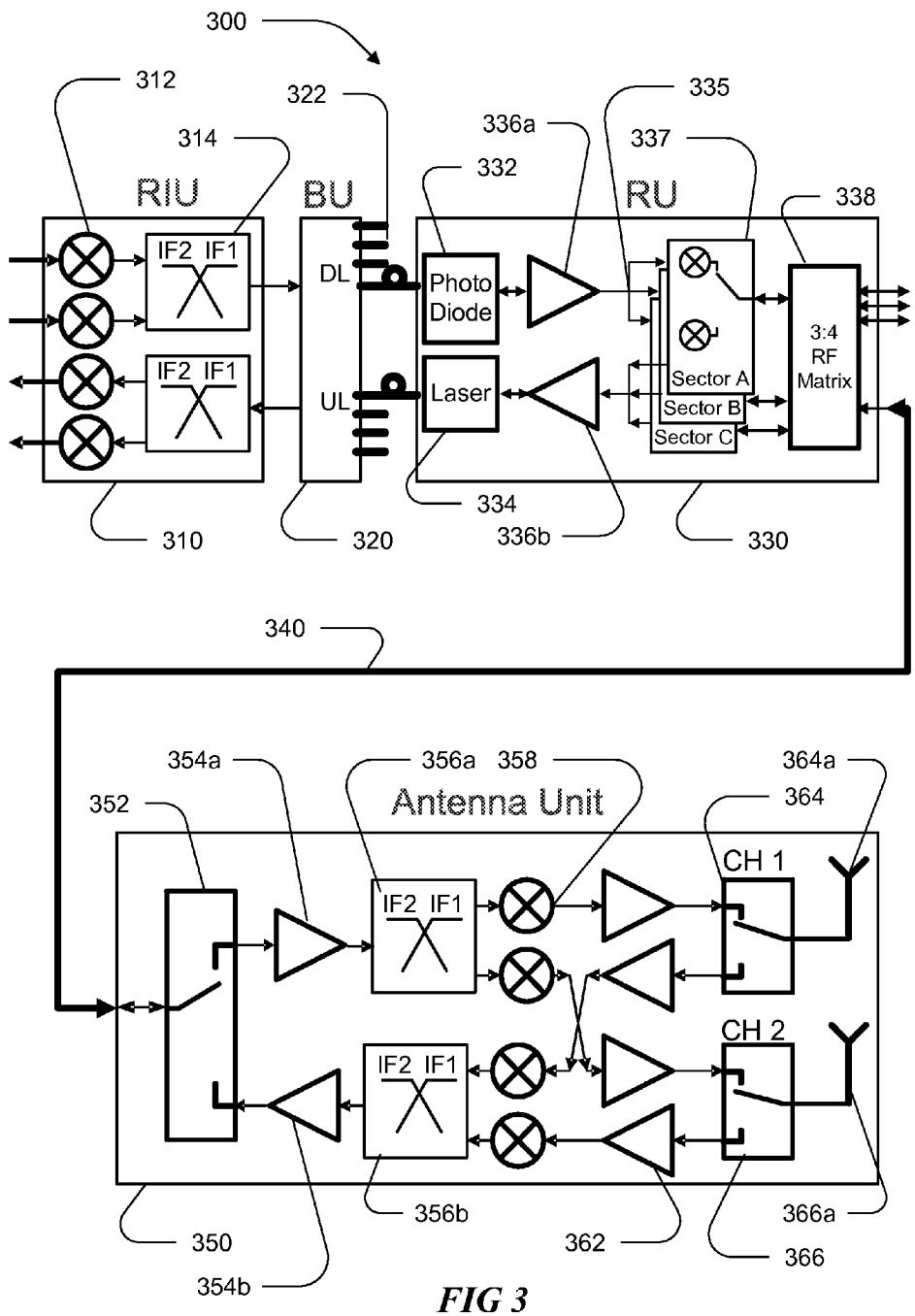
FIG. 3 is block diagram of an alternative embodiment of a distributed antenna system according to the invention.

As shown in FIG. 3, in accordance with an alternative embodiment of the invention, the system can maintain the same flexibility of association of sectors to antennas and the functionality of the RIU is as described above (mapping each sector to a different frequency band). The RU 330 can map all sectors to the same frequency band and use a switch 335 to select the sector to be associated with each of its ports and each port being connected over a separate coax cable to a specific AU 350. In this embodiment, the amount of spectrum consumed on the coax under this scheme is the amount required to support a single sector, regardless of the number of sectors supported in the full system.

The embodiment of FIG. 3 is similar to FIGS. 1 and 2 above. The RIU 310 can be connected to one or more BTS units (not shown). The RIU 310 can include mixers 312 and duplexer/de-duplexers 314 and be coupled to the BU 320 over a DL connection and an UL connection. The BU 320 can be the same as BU 120 and BU 220 as describe above. Further, each antenna unit AU 350 can be the same as AU 150 or AU 250 as described above.

The RU 330 can be similar to RU 130 and RU 230, and include a photo diode based system 332 for converting the DL optical signals to RF signal and a laser based system 334 for converting the UL RF signals to optical signals, along with amplifiers 336a, 336b to for adjusting the signal as needed.

For the DL spatial streams, the RU 330 includes a switch 335 which selectively connects a particular DL spatial stream to one of set of TDD switching systems 337 which is associated with a particular sector and uses multiplexer 338 to connect each sector to one or more antenna units AU 350. Each TDD switching system 337 can include a DL mixer for converting the DL spatial stream to a common frequency band and an UL mixer for converting the UL spatial stream from the common frequency band to the initial received frequency band. Each AU 350 can be configured to communicate using the common frequency band. The common frequency band can be selected based on environmental conditions and the distances of the runs of cable 340 for the system. The common frequency can be the same as the most common frequency used the RIU for converting the spatial streams, so no conversion is required for some signals (the most common) thus reducing the power requirements and potential for signal distortion on the most common signals.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

We claim:

1. An antenna unit for distributing downlink MIMO signals for at least one MIMO service in distributed antenna system (DAS) received over a single coaxial cable coupled to a single coaxial cable port, comprising:
   a single coaxial cable port coupled to a single coaxial cable, the single coaxial cable port configured to receive non-overlapping frequency MIMO downlink signals of at least one MIMO service over the single coaxial cable;
   at least two antenna unit downlink frequency shifters configured to frequency shift the non-overlapping frequency MIMO downlink signals to native frequency MIMO downlink signals; and
   at least two downlink output ports configured to receive and couple the native frequency MIMO downlink signals to at least two MIMO antennas, the at least two MIMO antennas configured to transmit the native frequency MIMO downlink signals,
   wherein the at least two antenna unit downlink frequency shifters are each configured to frequency shift the non-overlapping frequency MIMO downlink signals in a frequency range of 320 MHz to 520 MHz to native frequency MIMO downlink signals.

2. The antenna unit of claim 1, wherein the at least two antenna unit downlink frequency shifters are comprised of:
   a first antenna unit downlink frequency shifter configured to frequency shift a first non-overlapping frequency MIMO downlink signal among the non-overlapping frequency MIMO downlink signals to a first native frequency MIMO downlink signal; and
   a second antenna unit downlink frequency shifter configured to frequency shift a second non-overlapping frequency MIMO downlink signal among the non-overlapping frequency MIMO downlink signals to a second native frequency MIMO downlink signal.

3. The antenna unit of claim 2, further comprising an antenna unit downlink splitter configured to split the non-overlapping frequency MIMO downlink signals into the first non-overlapping frequency MIMO downlink signal and the second non-overlapping frequency MIMO downlink signal.

4. The antenna unit of claim 2, further configured to communicate the first native frequency MIMO downlink signal to a first MIMO antenna among the at least two MIMO antennas, and communicate the second native frequency MIMO downlink signal to a second MIMO antenna among the at least two MIMO antennas.

5. A method of distributing downlink MIMO signals for at least one MIMO service received by an antenna unit in distributed antenna system (DAS) over a single coaxial cable port coupled to a single coaxial cable, comprising:
   receiving non-overlapping frequency MIMO downlink signals of at least one MIMO service from a single coaxial cable port coupled to a single coaxial cable;
   frequency shifting the non-overlapping frequency MIMO downlink signals in at least two downlink frequency shifters to native frequency MIMO downlink signals; and
   transmitting the native frequency MIMO downlink signals over at least two MIMO antennas receiving the native frequency MIMO downlink signals,
   wherein frequency shifting the non-overlapping frequency MIMO downlink signals further comprises frequency shifting the non-overlapping frequency MIMO downlink signals in a frequency range of 320 MHz to 520 MHz to the native frequency MIMO downlink signals.

* * * * *